…

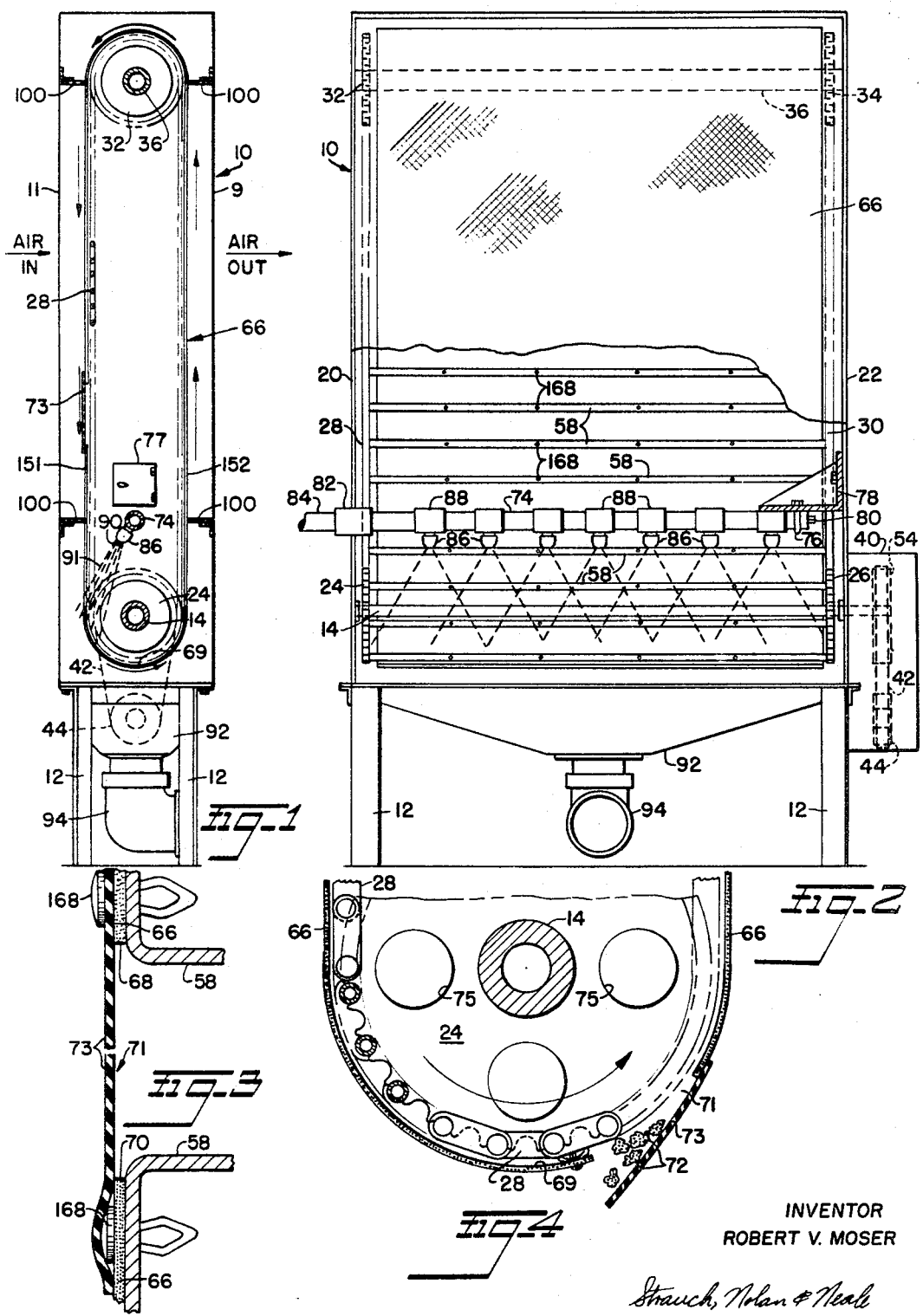

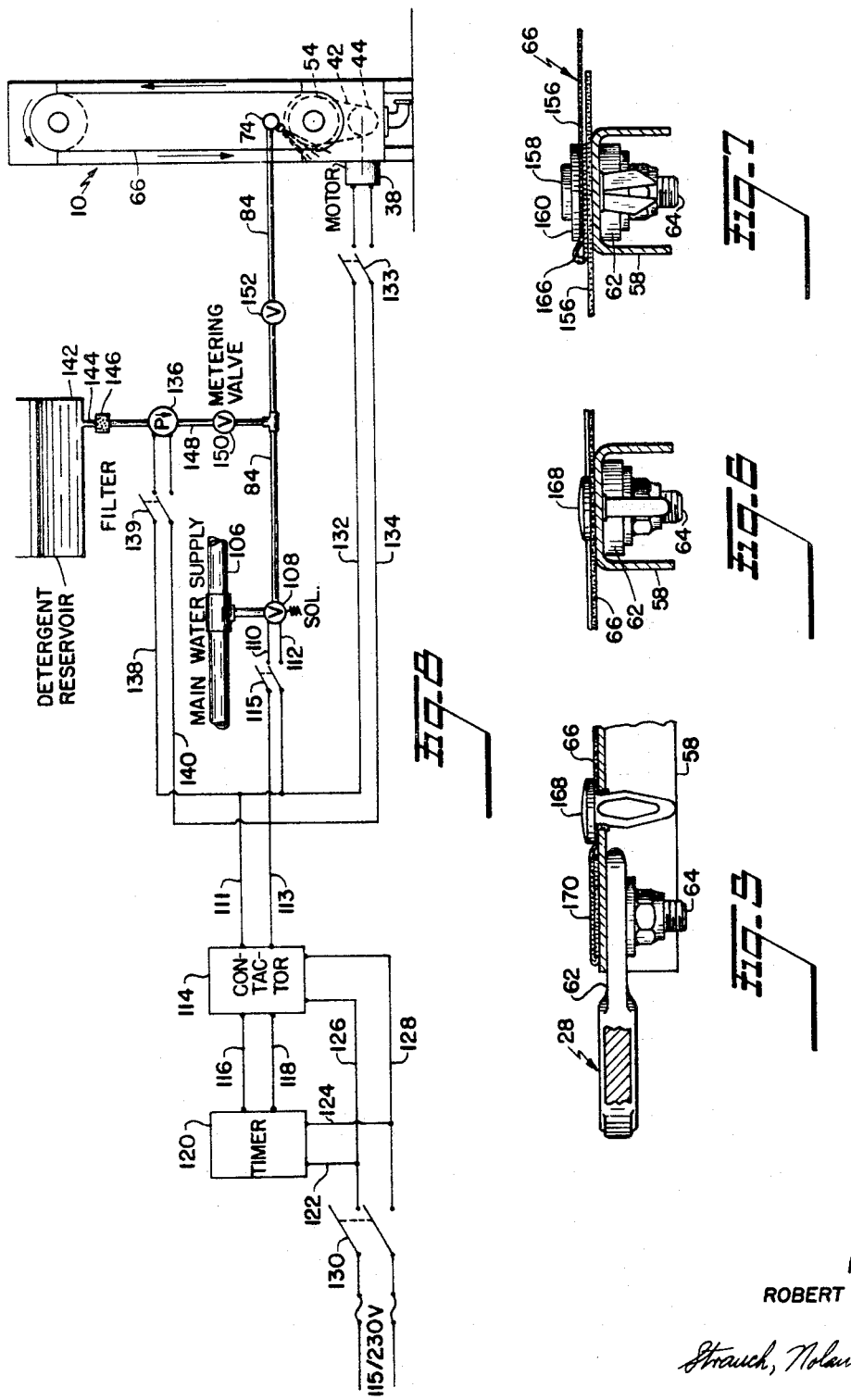

United States Patent Office 3,395,901
Patented Aug. 6, 1968

3,395,901
FILTER CONTROL AND CLEANING
Robert V. Moser, Northfield, Ohio, assignor, by mesne assignments, to North American Rockwell Corporation, a corporation of Delaware
Filed Sept. 8, 1964, Ser. No. 394,825
6 Claims. (Cl. 261—80)

ABSTRACT OF THE DISCLOSURE

A renewable filter assembly comprises an endless band of filter material disposed with parallel flights vertical and normal to the air flow path with upper and lower seals defining a filter zone. A stream of cleaning liquid sometimes containing a detergent is directed at an acute angle against the inner side of the flight first traversed by the air to be cleaned below the zone, and periodic advance of freshly cleaned filter material into the zone is so limited that no more than half of the zone in the flight last traversed by the air being cleaned is occupied by freshly wetted filter material, to prevent undesirable restriction of air passage in the zone by wetted filter areas. The endless band has an openable flap or trap door section which automatically opens during each band movement cycle to permit the washing out of accumulated lint balls and the like.

---

The present invention refers to air cleaner filter assemblies and more in particular to a self-cleaning air filter of the moving band type. The term air as used herein refers to any gas or like fluid.

It is known to install in certain buildings, especially in particular branches of the manufacturing industry, large panel type air filters in which the filter media comprises a band or roll which is moved continuously across the incoming air stream to be cleaned. These moving type filters can be generally divided into three classes:

(1) *The discardable dry type* in which the clean filter media is unrolled from a supply roll, moved across the air stream and wound up onto another roll which is discarded after the end of the roll is reached. A new supply roll of clean filter media must be installed for further operation. This type is objectionable from the standpoint of high maintenance and replacement costs, and interruption to operation while the clean filter is placed in position. Furthermore, the unwinding of the roll near the end has to be monitored so that replacement can be made at the proper time.

(2) *The oil bath type.*—In this type a continuous endless band or screen of filter media is provided which moves across the air stream. The lower end of the band is continuously immersed in an oil bath in which the dirt is scrubbed off the returning part of the filter band. Often this oil bath at the bottom of the filter is purposely agitated to enhance the scrubbing action of the fluid and extract the dirt out of small interstices of the filter media which if left therein would in time clog the filter and seriously restrict air flow and impair filter efficiency.

In addition, the oil bath has to be cleaned and replenished with new oil at intervals which creates a maintenance problem.

(3) *The water wash type.*—In this type, the moving filter band or screen is continuously washed by a water rinse or the like as it moves in a path. This has been proven to be the most effective especially in high dust and lint infested atmospheres. The present invention is concerned with water wash type filters.

Dust and lint collection in the raw textile and fiber processing industry is quite large since those fine and very light particles are readily carried off by a moving air stream. Filtering this air, therefore, has become a difficult problem and in the past no effective filter has been provided to economically handle this dust problem. Filtering of these fine light weight particles and material has been unreasonably expensive due to the high initial installation costs and following high replacement costs in operation since the filter media had to be frequently replaced because it would become clogged in a short time.

In one example, conventional discardable roll type filters (type 1) were used in a fiber processing plant and the maintenance log book showed after 60 days an average usage of one roll of filter media per day at a cost far in excess of the original recommended filtering cost estimate. These unusually high operating costs, in addition to the initial purchase price of the complete filter units are, of course, objectionable from a standpoint of economy.

During tests another disadvantage common to all endless band or screen filter types was discovered. During operation of the unit, especially in fiber processing plants, line accumulated in the inside bottom loop of the moving endless filter band which would not wash out or be blown out the other side of the filter so that, in time, the lint accumulation would ball itself up and seriously hamper the operation of the unit unless the unit is dismantled and the lint accumulation in the bottom of the loop removed.

Accordingly, it is the major object of the present invention to provide a novel automatic endless band or screen type panel filter having a permanent filter media which in continually washed as it moves around.

Another object of the invention is to provide a novel arrangement for removing lint and the like from the bottom loop of an endless filter band.

Another object is the provision of a novel water spray means inside the bottom loop of an endless band type panel filter to continually spray the filter media as it moves around to wash out the dirt and dust collected by the media.

Another object of the invention is to provide a novel air filter assembly wherein a section of a substantially endless movable band of filter media is periodically opened for flushing of particles from the interior thereof.

Another object of the invention is to provide a novel air filter assembly wherein a substantially endless band of filter material has parallel vertical flights in the direct flow path of air to be cleaned and correlated means for periodically opening a section of the band spaced from said flights to enable internally accumulated particles to be flushed therethrough.

A further object of the invention is to provide a novel air filter assembly wherein a substantially endless band of porous filter material permeable to air under pressure is periodically moved to locate a fresh section of filter material in the path of flow of air to be cleaned, and correlated means for successively washing filtering areas after they have been moved from said flow path.

Still another object is to provide the use of a detergent or surfactant in the spray water of an automating endless type panel filter to further enhance the cleaning action of the spray water.

A further object of the present invention is the provision of a wholly automatic water and detergent washed roll type panel filter assembly incorporating an electrical circuit with timing means and suitable switching to control movement and washing of the filter.

A still further object of the present invention is the provision of an endless filter band in a moving type washed panel filter whose ends are spaced to provide an opening in the band which is normally covered by a strip of relatively stiff, preferably rubber like material which when the endless filter band goes around the lower loop tends to stay tangential to the radius of the loop hereby forming on opening in the loop through which accumulated lint and other large contaminants may be washed out of the loop.

Other objects and novel features will become apparent or especially be pointed out in the following detailed description in connection with the appended drawings in which:

FIGURE 1 is a side view of an endless screen type filter assembly according to a preferred embodiment of the invention with the side panel broken away and some parts shown in section to illustrate the spray and other arrangements;

FIGURE 2 is a rear view of the filter assembly of FIGURE 1 with parts broken away and in section to further illustrate the filter band and spraying arrangement;

FIGURE 3 shows in enlarged fragmentary view showing in detail in section the attachment of the lint removal rubber flap to one end of the endless filter band;

FIGURE 4 is a fragmentary view partly in section of the lower end of the assembly howing the opening of the lint removal flap when the filter band passes around the lower loop;

FIGURES 5 and 6 are fragmentary views in section illustrating the attachment of the endless filter screen to the transverse curtain support bars;

FIGURE 7 is a fragmentary view in section showing the attachment of the end panels to each other and the curtain support bar to form an endless screen; and FIGURE 8 is a diagrammatic illustration of the control, timer and pump circuit for filter assembly of FIGURES 1–7.

With reference to FIGURES 1 and 2 the endless band or screen type automatic wash filter assembly comprises a rectangular box like frame 10 of sheet metal or the like supported vertically on legs 12. Contained within the lower section of frame 10 is a rotatable transverse shaft 14 suitably supported at both ends in side panels 20 and 22 of frame 10. Attached to the outer ends of the shaft 14 adjacent panels 20 and 22 are sprockets 24 and 26 respectively which each receive an endless roller chain 28 and 30. Chains 28 and 30 are parallel and extend upwardly through the frame 10 alongside side panels 20 and 22 to pass over identical sprockets 32 and 34 at the top of the box like frame 10. Sprockets 32 and 34 are likewise attached to a rotatable shaft 36 suitably supported for free rotation parallel to shaft 14 in the top section of the frame 10.

Chains 28 and 30 are periodically driven by an electric motor 38 (FIGURE 8) the shaft of which mounts a sprocket 44 having a chain or V-belt 42 drive connection to an outer sprocket 54 on a side extension of shaft 14 projecting within an enclosure 40. This provides a speed reducing transmission since the sprocket 54 is considerably larger than sprocket 44. Thus, when motor 38 is started chains 28 and 30 will be driven around their respective sprockets 24, 26, 32 and 34, and because of the speed reducing transmission they move the filter band 66 at a relatively slow linear speed, preferably about 3 feet per minute.

Roller chains 28 and 30 are connected together by a number of transverse parallel channel type support bars 58 which are secured at oposite ends to links 62 of the chains 28 and 30 as by lock nut and bolt assemblies 64 shown in FIGURE 5. Support bars 58 rigidly bridge corresponding links 62 and move with the chains. The bars 58 support an endless band or screen of flexible filter media 66 secured thereto as will appear. The filter media may be comprised of various relatively porous air permeable materials depending on requirements of air resistance, filtering efficiency and washability desired for any particular application. Experience showed that for contaminants of small dirt particles mixed with lint fibers, a ½" thick fiberglass material sandwiched between layers of aluminum screen provides the best results. For predominantly lint or other fibrous loads containing small amounts of dirt particles, a stainless steel screen cloth is most satifactory. More recently the cellular contruction of polyurethane material has been found adaptable in a wide range of filter applications of this type.

The filter media 66 is attached to each of the support bars 58 by means to be later described, and the ends 68 and 70 of the endless filter band are preferably spaced apart a distance corresponding to the distance between two adjacent support bars as shown in FIGURE 3. This provides a transverse opening 71 in the filter band 66 which is normally covered by a relatively stiff rubber or like hinged flap 73 attached along one edge to the end 68 of the band 66. Flap 73 is provided not only to bridge the opening 71 between the two ends of the filter media but to provide a wash out opening through the filter band as will appear. Even though this gap 71 appears in the band such a band is substantially endless within the meaning of the invention. The filter band 66 is therefore carried by bars 58, and is not stretched from its designed thickness by drive forces moving the chains.

It was described above that during operation of such filters lint and the like may accumulate in the form of balls created by the moving screen in the bottom loop 69 of the endless band of filter media 66, which in most instances is not washed or blown out and therefore has to be removed manually from time to time to prevent clogging of the filter. This requires interruption of filtration, stopping the rotation of the filter band and virtually dismantling the unit.

The flap arrangement at 73 solves this problem. As the interrupted band section shown in FIGURE 3 passes along the straight vertical sections of the path, the relatively stiff flap 73 tends to remain straight to bridge opening 71. However, when this section of the endless filter band 66 passes around the lower sprockets 24, 26 the stiff flap 73 tends to remain in a straight condition tangential to the radius of the loop around the sprocket and thus uncovers the opening 71 when approximately at the bottom of the loop as shown in FIGURE 4. This is at the point of washing, so that the accumulated lint balls such as indicated at 72 will be washed out through the opening 71.

As shown in detail in FIGURES 3 and 4, flap 73 is effectively hinged at the end which points in the direction of rotation. The flap edge is attached to a channelled support bar 58 as by a row of snap-in rivets 168 (FIGURE 3) that extend through the end 68 of the endless filter band 66. Flap 71 is preferably of such size as to extend across the opening 71 between two support bars 58. The other end of flap 73 freely overlies the end 70 of the endless filter band 66 which is similarly secured to the adjacent support bar 58 as by rivets 168.

The pressure of air flow on the intake side (the left side of FIGURE 1) together with the seal strips 100 in the frame 10 hold flap 73 pressed against the filter band when it is located as in FIGURE 1 thus normally closing opening 71 during effective filtering operation to prevent passage of any unfiltered air. However, at the lower loop of the endless filter band this outside pressure upon the rubber flap is relieved, and the free end of the relatively stiff flap moves away from the filter band as shown in FIGURE 4, thus opening the filter band at 71 to allow balled-up lint collections 72 to be washed out.

When no flap is used the lower sprockets 24, 26 may be provided with a number of holes 75 as shown in FIGURE 4 to aid the lint flush-out from within the filter.

If desired, an inspection door 77 may be provided in either side panel 20 or 22 (FIGURE 1) to inspect the filter and water spray operation and to manually remove large wads of lint and the like.

With continued reference to FIGURES 1 and 2, at the lower part of frame 10 a pipe 74 extends through side panel 20 transversely across frame 10 within the endless filter band 66 and is attached as by means of a U-bolt 76 to bracket 78 secured inside of the other side panel 22. The right end of the pipe 74 in FIGURE 2 is closed as by a plug 80. The other end of pipe 74 is connected as by a coupling 82 to a water supply line 84 which leads into the main water supply (FIGURE 8). Pipe 74 thus extends transversely through the interior of the endless filter band 66 parallel to the planes of the filter band.

Pipe 74 is positioned just above lower loop 69 of the endless filter band 66 and has a number of spray heads 86 attached thereto as by T-connectors 88. The number of spray heads in any individual case will depend on the width of the filter but enough of them should be provided to fully spray a large transverse area of the filter band. Spray heads 86 are oriented downwardly and outwardly at an angle as shown in FIGURE 1 and are provided with spray discharge openings 90 which direct jet sprays of water 91 at an acute angle onto the downwardly moving portion or flight of the filter band all across the inner side of the lower loop 69 as the successive band areas occupy the loop following being exposed to intake air. Since the dust and lint particles tend to collect mainly on the outer surfaces of band 66, the action of spray heads 86 in forcing water under pressure through the glass, metal or plastic fabric structure of band 66 dislodges those particles which fall with the water into trough 92.

As viewed in FIGURE 1, movement of the filter band is counterclockwise. The endless band 66 moves in a straight vertical path down the front portion 11 of frame 10 which is the air intake side, and moves upwardly in a straight vertical path at the rear frame portion 9 which is the air outlet side. Thus the final filter area through which air passes into the air outlet has just been cleaned by the water spray. This arrangement has been found most effective for efficient cleaning of the air.

To dispose of the spray water and dirt washed off the filter band, a trough 92 may be provided at the bottom of the unit between the legs 12 which connects into a drain pipe 94 leading into the local sewer or other disposal. In other instances the upright filter may rest on concrete or some other base and drain directly into the installation drain.

In certain instances the outlet side 9 of the filter unit may if desired be provided with separate dry absorbent filter panels to separate any water which may be carried over with the air stream. However, these filter panels will not be necessary if the filter band moves at a conventional speed of 3 feet per minute or slower and air velocity is 1,000 feet per minute or less since at these speeds water carry-over is insignificant.

To prevent any unfiltered air from moving around the outer surface of the filter band 66 the unit is sealed in both horizontal and vertical directions as by the stiff but flexible neoprene strips 100 shown in FIGURE 1. These strips 100 are attached inside of the frame 10 and their free edges bear wipingly against the edges of the filter band and above and below the actively filtering areas, thus substantially hermetically sealing the space between the filter band and the interior of the frame 10 around the air passage through the assembly. These strips 100 also dislodge larger dirt particles from the band and aid in removing excess water from the band.

Although the jets of water spray from spray heads 86 will in many cases be sufficient to satisfactorily clean the filter band 66, using adequate pump capacity and pressure at the nozzles, in the present invention provisions have been made to add a detergent to the spray water for particularly dirty conditions. Such conditions are found in fiber processing plants wherein a process known as wool carding results in heavily contaminated air that carries a mixture of grease, wool fibers and fine dust and dirt particles. As explained before, disposable dry type roll filters are insufficient in such extreme conditions and their use would be economically unsound due to the unreasonably high rate of replacement. Conventional automatic filterwashing action would not remove all of the grease and greasy wool fibers from the filter elements.

The present invention provides means to automatically add a detergent to the spray water at timed intervals and in automatically measured amounts. This is accomplished by the means diagrammatically illustrated in FIGURE 8 as will appear. The detergent can be selected from a variety of commercially available products on the basis to provide optimum cleaning action upon any particular contaminant. This would act not only as a detergent but also as an emulsifier and effective penetrant.

With reference to FIGURE 8 a typical complete installation utilizing the invention may comprise a main water supply line 106 from which pipe 84 is connected to the spray head pipe 74 in the filter frame. Supply of water to the spray head pipe 74 in the filter frame. Supply of water to the spray heads 86 at timed intervals is controlled by a solenoid valve 108. If sufficient water pressure is not available, a booster pump (not shown) may be installed and connected to operate when valve 108 is opened. Valve 108 is located in pipe 84 and is electrically connected by leads 110 and 112 to the output leads 111 and 113 of a contactor 114 of any known commercially available type suitable for the particular application. Switch 115 of the contractor (diagrammatically shown outside the box 114) acts to energize or de-energize the solenoid at timed intervals determined by the timer 120.

The input end of the contactor 114 has lead connections 116 and 118 to an electrically operable timer mechanism 120 which may be of the 60 minute repeating type of any known conventional commercially available construction. The timer mechanism 120 is connected by leads 122 and 124 to a 115 volt single phase 60 cycle electric current source which energizes the coil of the contractor 114 by means of leads 126 and 128. A suitable main switch 130 may be used to connect or disconnect the electric current source.

The output leads 111 and 113 of the contactor 114 are also connected by leads 132 and 134 to motor 38 which drives the filter band 66, and also to a detergent feeder pump 136 by means of leads 138 and 140. A contactor switch 139 is shown outside box 114 in the pump circuit, and a contactor switch 133 is shown outside box 114 in the motor circuit. Detergent feeder pump 136 is adapted to pump detergent from a reservoir 142 through pipe 144 and filter 146 into pipe 148 from which the detergent is metered into the water supply pipe 84 by means of a metering valve 150. The type and amount of detergent to be fed into the cleansing water will vary with each application depending on the type and amount of contaminant, the presence of waxes or oil, hardness of the water and amount of water consumption which, of course, varies with the size of the filter.

The water supply pipe 84 is further provided with a manual safety shut-off valve 152 to close the water supply when the unit is not in operation and during maintenance work.

When main switch 130 is closed, timer 120 operates at preset intervals through the common contactor 114 to close switches 133, 139 and 115 simultaneously start filter drive motor 38 and the detergent feeder pump 136 and open solenoid valve 108. The motor 38 drives filter screen 66 at a relatively slow linear speed of approximately 3 feet per minute and through a distance not more than half the vertical length of the air passage opening during which time the moving loop sections of the filter screen at the lower end of the screen are pressure sprayed with water usually mixed with detergent through the spray heads 86. The pressurized sprays of the water and detergent mixture penetrate the filter screen and effectively washes off all dirt, dust and other contaminant from the sprayed filter areas. The spray of cleansing fluid effectively penetrates the very fine interstices of the filter media and passes through and washes them clean from any foreign material which has become clogged therein so that the air or fluid or gaseous substance to be filtered can once more freely pass therethrough.

The movement of the filter screen 66 and the washing action applied to it are intermittently controlled by the suitably preset timing means at 120. The linear distance of travel of the filter screen is always such that the wetted, cleaned area of the filter screen disposed in the air flow path at the downstream side of the filter (the right vertical flight of FIGURE 1 between seals 100) will not cover more than half of the air passage opening. In other words, it is important that enough of unwetted filter screen remains exposed to the air stream at that region to prevent a considerable pressure drop due to excessive resistance caused by water webbing over the screen interstices.

Thus during operation the incoming air to be cleaned passes for a timed interval through both vertical flights of band 66. The left flight, indicated at 151 lying between seals 100 is dry and subjected to the most contaminated air. The air is partly cleaned by passage through flight 151 and then further cleaned by passage through the right flight 152 in FIGURE 1. This flight 152 may be initially wet since it has been drawn up from the washing zone but it soon dries until all of the filter area at 152 is dry and efficiently filtering the air.

At the end of the timed interval, timer 120 actuates the contactor 114 to operate motor 38 to shift fresh areas of the filter band into each flight. Preferably the band 66 is moved linearly during this period a distance not more than one-half the vertical distance between seals 100. At the same time that the band starts to move the jets 86 start to spray the band which is moving only very slowly so that the area of the band moving down from flight 151 is cleaned entirely across its width and for a linear distance equal to the advance of the filter band. During the times when flap 73 is disposed as in FIGURE 4 the interior of the band is also cleansed. This spray preferably shuts off when band movement stops. The supply of detergent to the spray water is concomitant with the time of spraying.

It shall be understood that the control mechanism diagrammatically shown in FIGURE 8 is to be considered illustrative only since it is obvious that different control arrangements may be used to obtain the same results depending on installation requirements and facilities within the building in which the filter is to be installed.

The band 66 may be a continuous strip of filter material or it may be composed of separate longitudinal sections. In any event whether it is continuous or sectional it is fastened to the cross bars 58, so that the drive force moving the band to a new position is not exerted through the filter material itself, so that its filtering characteristics remain constant.

Referring now to FIGURES 5–7 there is illustrated more in detail the attachment means of filter band sections 156 to each other and to the support bars 58 to form an endless filter band. The separate filter sections are preferably attached to each other in overlapping fashion as illustrated in FIGURE 7 by fasteners 158 and a retainer plate 160 to reinforce the joint. The assembly is then clipped by means of the same fastener onto the transverse curtain support bars 58.

It shall be noted from FIGURE 7 that filter sections 156 are overlapped in such fashion that the overlapped loop end 166 of the top sections point away from the direction of travel of the filter screen so that no dirt or moisture will be collected thereby which would otherwise contaminate the joint.

For more stability, the intermediate portions of the individual relatively large filter sections 156 may be attached to others of the supports bars 58 as by fasteners 168 as illustrated in FIGURES 5 and 6. The outer edges of the filter sections 156 are bent under as shown at 170 on both sides to prevent the filter media from injury at the edges.

The last filter section is then attached to the first section in the same manner as illustrated in FIGURE 7 to form an endless screen, or the gap 71 may be provided there as in FIGURE 3.

An advantage of providing separate filter sections instead of one continuous screen is that, if a section of the endless screen becomes inadvertently clogged or otherwise damaged it can be easily replaced with a new section, whereas in case of a continuous band the entire screen must be replaced.

The features of filter band movement control and washing are however independent of whether the band is continuous or sectional.

The present invention provides a highly effective endless band type automatically water washed filter which is at timed intervals shifted to expose new areas into the air flow path and washed clean with a detergent water spray, thus providing a permanent type filter media which needs not be replaced but is used over and over again.

An extremely effective cleaning action is provided by mechanical agitation through the water spray nozzles in addition to the chemical action of a detergent added to the water which not only acts as a cleansing agent but also as an emulsifier and penetrant for the filter screen.

The present invention may be embodied in other forms without departing from the spirit and essential characteristics thereof, therefore, the present embodiment is to be considered in all respects as illustrative only and not restrictive, the scope of the invention being indicated by the appended claims rather than by the foregoing description.

What is claimed and desired to be secured by Letters Patent is:

1. An air or like screen type filter assembly comprising a substantially endless band of water resistant air permeable filter media having downwardly and upwardly movable flights connected by an arcuate portion, said downward flight having its outer surface disposed in the path of flow of the air to be cleaned and initially filtering said air and said upward flight having its inner surface disposed in said path and finally filtering said air, means for periodically moving said band to locate successive filtering areas thereof in the air path, means for discharging washing liquid under pressure through areas of said band that have been displaced out of the air flow path comprising nozzle means extending substantially the width of said band and disposed adjacent the inner surface of said downward flight and immediately above said arcuate portion said nozzle being downwardly and outwardly inclined toward said downward flight to direct liquid downwardly in a stream that intersects the inner surface of said downward flight at an acute angle as said downward flight enters said arcuate portion, and reservoir means for collecting said liquid at the region below said arcuate portion, the intersection between said stream and said downward flight being above said reservoir to facilitate the flow of said stream through said flight.

2. In the filter assembly defined in claim 1, said band being mounted upon a carrier comprising a pair of chains connected by cross bars on which said band is secured, and said band moving means comprising sprockets mounting said chains.

3. In the filter assembly defined in claim 1, means for forming an opening through said band during each cycle for flushing out accumulated filtered material adjacent said arcuate portion.

4. In the filter assembly defined in claim 1, wherein said periodically moving means moves said band such a distance that not more than one half of the air filtering area of said upward flight is composed of freshly washed filter media.

5. An air or like filter assembly comprising an endless band of air permeable screen-type filter media connected to endless carrier means and disposed in the path of flow of air to be cleaned, means for periodically moving said carrier means and band a predetermined linear amount to locate successive filter areas in said path, means for periodically washing successive areas of said band from the interior, and means for periodically forming a through opening in said band for enabling said washing means to flush accumulated filtered material through said opening.

6. In the filter assembly defined in claim 5, said band passing over an arcuate surface during part of its movement, and said means for forming said opening comprising a transverse gap in said band normally bridged by a relatively stiff flap connected along one edge to said band at one side of the gap, said flap being adapted to extend away from said band and uncover said gap as the band passes over said arcuate surface.

References Cited

UNITED STATES PATENTS

| | | | |
|---|---|---|---|
| 246,263 | 8/1881 | Wilson | 261—80 X |
| 1,941,524 | 1/1934 | Wittemeier et al. | 261—80 X |
| 2,870,864 | 1/1959 | Brixius et al. | 261—80 X |
| 3,252,691 | 5/1966 | Getzin et al. | 261—80 |

FOREIGN PATENTS

| | | |
|---|---|---|
| 235,214 | 6/1960 | Australia. |

HARRY B. THORNTON, *Primary Examiner.*

E. H. RENNER, *Assistant Examiner.*

UNITED STATES PATENT OFFICE
CERTIFICATE OF CORRECTION

Patent No. 3,395,901                            August 6, 1968

Robert V. Moser

It is certified that error appears in the above identified patent and that said Letters Patent are hereby corrected as shown below:

Column 2, line 21, "line" should read -- lint --; line 31, "in" should read -- is --. Column 3, line 24, "howing" should read -- showing --; line 31, "panelis" should read -- panels --. Column 4, line 7, "contruction" should read -- construction --. Column 6, lines 18 and 19, cancel "Supply of water to the spray head pipe 74 in the filter frame."; lines 28 and 37, "contractor", each occurrence, should read -- contactor --. Column 7, line 74, "supports" should read -- support --.

Signed and sealed this 23rd day of December 1969.

(SEAL)

Attest:

Edward M. Fletcher, Jr.

Attesting Officer

WILLIAM E. SCHUYLER, JR.

Commissioner of Patents